United States Patent
Lipinski et al.

(10) Patent No.: US 9,754,475 B2
(45) Date of Patent: Sep. 5, 2017

(54) MAGNITUDE BASED ALARM FLAP DETECTION

(71) Applicant: CA, Inc., New York, NY (US)

(72) Inventors: Gregory James Lipinski, Loveland, CO (US); Richard George Kenders, Fort Collins, CO (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/982,749

(22) Filed: Dec. 29, 2015

(65) Prior Publication Data
US 2017/0186302 A1 Jun. 29, 2017

(51) Int. Cl.
G08B 21/00 (2006.01)
G08B 21/18 (2006.01)

(52) U.S. Cl.
CPC .................................. *G08B 21/182* (2013.01)

(58) Field of Classification Search
CPC .............................. H04L 1/00; H04L 12/2602
See application file for complete search history.

(56) References Cited

U.S. PATENT DOCUMENTS

2012/0030523 A1* 2/2012 Li .................. H04L 12/2602
714/47.3

OTHER PUBLICATIONS

Nagios, "Detection and Handling of State Flapping", Nagios Core, Mar. 6, 2007, 3 pages. https://assets.nagios.com/downloads/nagioscore/docs/nagioscore/3/en/flapping.html as visited Nov. 4, 2015.
OpenNMS, "Flap Detection", Open NMS, Aug. 6, 2009, 3 pages http://www.opennms.org/wikiFlap_detection as visited Nov. 4, 2015.

* cited by examiner

*Primary Examiner* — Shirley Lu
(74) *Attorney, Agent, or Firm* — Gilliam IP PLLC (57) ABSTRACT

A flap detector can detect significant flapping with magnitudes of state deltas (i.e., differences between values representing events or states). The flap detector aggregates monotonic state deltas. Aggregating monotonic state deltas yields a magnitude of monotonic state deltas. A magnitude of a series of same direction state deltas can be considered the magnitude of flap because the end of the series corresponds to a beginning of a state delta series in a different direction. When directional transition occurs (i.e., flapping occurs), the flap detector generates multiple monotonic state delta magnitudes. The determined magnitudes can be used to filter out insignificant flapping that could be considered noise.

20 Claims, 4 Drawing Sheets

MAGNITUDE BASED ALARM FLAP DETECTION

BACKGROUND

The disclosure generally relates to the field of data processing, and more particularly to flap detection.

In various areas of computing, the rapid change in state of a system or system component, either software or hardware, typically corresponds to a problem. This rapid change in state is referred to as "flapping." In addition to the problem causing the flapping, flapping itself can cause a high volume of notifications or alarms that may exacerbate the problem's impact on the system, perhaps further degrading system performance. Detecting flapping can lead to investigation of the cause of the flapping rather than investigating the individual state changes.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to arrays in multiple examples. Embodiments are not limited to using arrays and can use a different data structure to store values that allows the values to be accessed in forward and/or reverse order. In other instances, well-known instruction instances, protocols, structures and techniques have not been shown in detail in order not to obfuscate the description.

INTRODUCTION

Although flapping typically relates to rapid change in state of a system, flapping can also occur in measurements of various resources. Although the rapid change in resource measurements can be considered a state change, this description refers to state changes and resources measurements separately to help explain possible differences in handling the detection of flapping in state or resource measurements. A system or system component state change typically relates to operability (e.g., device failure, connection lost, restart, sleep, etc.). A system/component often measures resources for determinations about performance, quality of service ("QoS"), etc. A change in state or resource measurements can relate to a condition or a threshold. Example changes include a component failure, installation of a component, a change in resource consumption with respect to a threshold or condition, and a change in a performance measurement.

A change in state or resource measurement can be accompanied by an alarm. An alarm can be a notification of a change and/or quantify the change with an alarm level. Since flapping in either state or measurements can result in a series of alarms with different alarm levels, flapping can also occur in alarm levels.

Sensors and/or components detect occurrence of changes and indicate the changes. The sensors and/or components can indicate the changes as events with any one of a variety of techniques: interrupt driven messaging, inter-process communication, publisher-subscriber messaging, and a posting mechanism (e.g., recording an event indication into a buffer). An event manager (e.g., an operating system process or executing application) can be programmed to process event indications differently. An event manager may present event indications (e.g., display event based information in a graphical user interface dashboard), implement corrective actions based on event indications, notify a component to take corrective action based on event indications, etc.

Overview

A flap detector can detect significant flapping using magnitudes of deltas. A delta is a value that represents a change. The delta is determined by computing a difference between values representing a system attribute being monitored (e.g., system/component states or resource measurements. As changes in a monitored system attribute ("monitored attribute") occur, a series of deltas can be generated in different directions (e.g., increasing changes followed by decreasing changes). Consecutive deltas in a same direction are monotonic deltas. The flap detector aggregates monotonic deltas (e.g., adds the deltas). Aggregating monotonic deltas and disregarding direction yields a magnitude of monotonic deltas. A magnitude of a series of same direction deltas can be considered the magnitude of flap because the end of the series corresponds to a beginning of a delta series in a different direction ("directional transition"). When directional transition occurs (i.e., flapping occurs), the flap detector generates multiple monotonic delta magnitudes. The determined magnitudes can be used to filter out insignificant flapping that could be considered noise. The flap detector uses a first configurable threshold to identify the flaps that are significant. The flap detector can then use a second configurable threshold to determine whether a count of the significant flaps is significant. Although flaps may be significant in magnitude, the count of significant flaps may be too few to be considered significant. The flap detector can also aggregate the significant flap magnitudes to derive an event indication for the flapping in a given time window.

Example Illustrations

Figure 1:
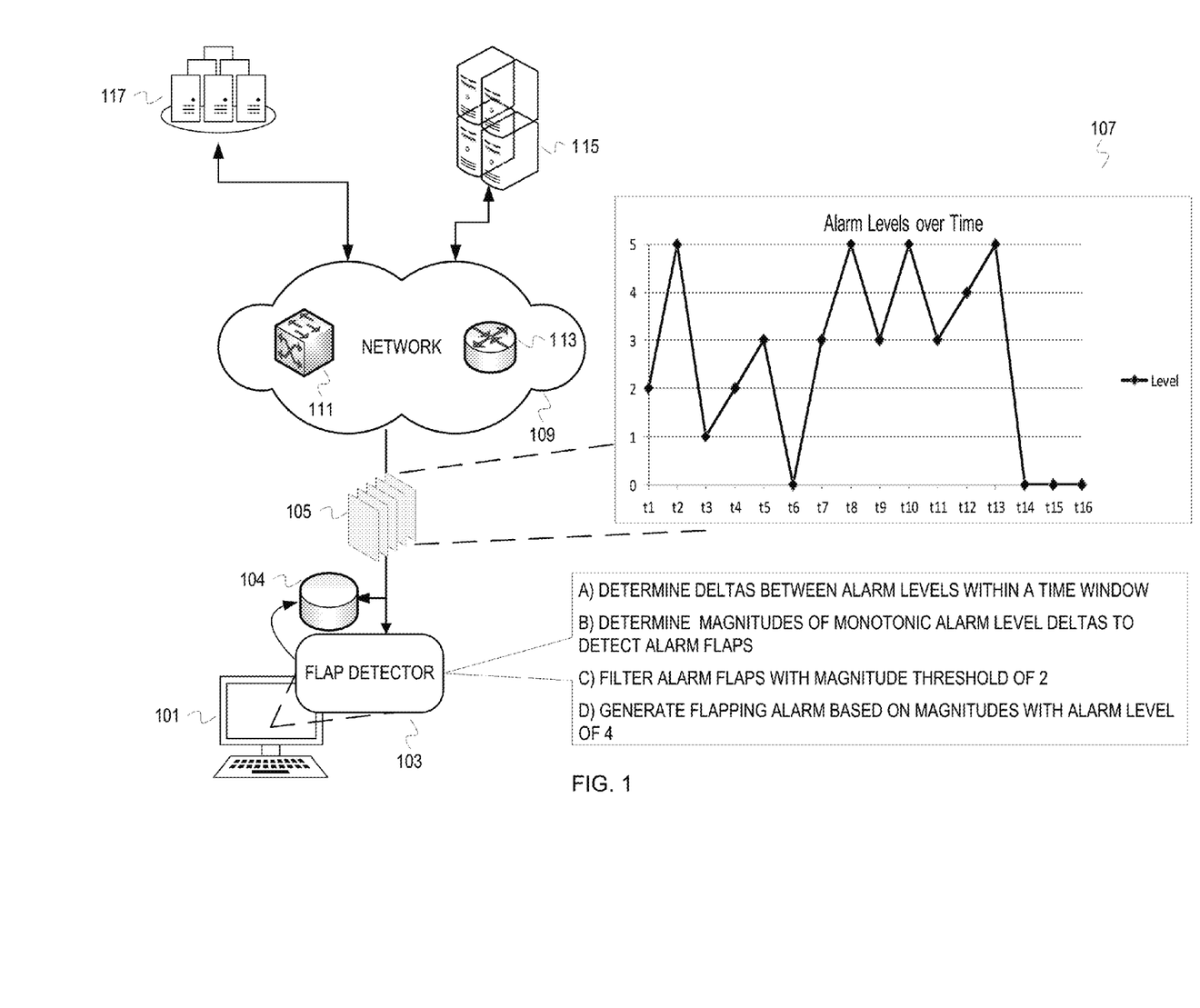
FIG. 1 depicts a conceptual example of alarm level flap detection based on flap magnitude.

FIG. 1 depicts a conceptual example of alarm level flap detection based on flap magnitude. In FIG. 1, an event management system processes events that occur across a network 109, a data center 117, and servers 115. The network 109 at least includes a switch 111 and a router 113. The illustration of these network elements, the data center 117, and the servers 115 is an attempt to illustrate the variety and scale of a system that in which events occur. Although FIG. 1 depicts higher level elements (i.e., the data center 117, servers 115, etc.) events also occur in hardware and software components of these depicted elements. The event management system includes or communicates with a flap detector 103 instantiated on a device 101. Over time, the flap detector 103 detects alarms 105 of the managed system. The flap detector 103 can detect storing of each of the alarms 105 into a store 104 or receive the individual alarms. A graph 107 depicts example alarm levels indicated in the alarms 105 from a time instant t1 to a time instant t16. Although a graphical user interface can present alarm levels over time, the graph 107 is provided to aid in illustrating this example and not a requirement that a user interface present the graphical information.

FIG. 1 lists a series of letters A-D. These letters represent operational stages, each of which may include multiple operations. Although these stages are ordered for this example, the stages illustrate one example to aid in understanding this disclosure and should not be used to limit the claims. Subject matter falling within the scope of the claims can vary with respect to the order and some of the operations.

At operational stage A, the flap detector 103 determines deltas between alarm levels within a time window. The alarms 105 indicate alarm levels over a time range spanning from t1 to t16. Table 1 indicates the alarm levels depicted in the graph 107.

TABLE 1

Alarm Levels over Time with Deltas and Flap Magnitudes

| Time | t1 | t2 | t3 | t4 | t5 | t6 | t7 | t8 | t9 | t10 | t11 | t12 | t13 | t14 | t15 | t16 |
|---|---|---|---|---|---|---|---|---|---|---|---|---|---|---|---|---|
| Alarm Level | 2 | 5 | 1 | 2 | 3 | 0 | 3 | 5 | 3 | 5 | 3 | 4 | 5 | 0 | 0 | 0 |
| Deltas | | | | 1 | 1 | −3 | 3 | 2 | −2 | 2 | −2 | 1 | 1 | | | |
| Flap Magnitude | | | | | | 2 | 3 | | 5 | 2 | 2 | 2 | | 2 | | |

The flap detector 103 processes alarm levels indicated in alarms for a defined time window. This illustration assumes the defined time window is 11 time instants, and the current time window encompasses time instants t3 to t13. A current alarm or most recent alarm corresponds to time instant t13. The time instants after t13 illustrate that the time window can slide forward in the future. The generation of an alarm defines a time instant for this example. In other words, a time instant is a time when an alarm is generated or when an underlying event occurred. A time window is a static or dynamic span of time based on one or more parameters. For example, a time window can be configured based on expected life cycle of a problem that causes flapping, states of a system being monitored, type of alarm or component, etc. The time window can also be arbitrarily defined by an administrator. The deltas from t3 to t12 may have previously been computed and stored in an array, or they could be computed on-the-fly. When the alarm for t13 is detected, the flap detector 103 reads the alarm level of a previous alarm and computes the delta between the previous alarm level and the alarm level of the t13 alarm. The flap detector 103 determines that the delta is 1 since the alarm level increased from 4 at t12 to 5 at t13.

At operational stage B, the flap detector 103 determines magnitudes of monotonic alarm level deltas to detect alarm flaps. Assuming the history of deltas is available in an array of deltas, the flap detector 103 can traverse the array of deltas from the most recently computed delta (i.e., the delta between alarm levels at t12 and t13) backwards in time until a directional transition is encountered (i.e., a change in delta sign). The flap detector 103 encounters a directional transition at the delta between alarm levels at t11 and t12. While traversing the entries, the flap detector 103 can accumulate a sum. The flap detector 103 determines that the delta between alarm levels at t11 and t12 is a same sign as the delta between alarm levels at t12 and t13 and computes a sum. The flap detector 103 then determines that the delta between alarm levels at t10 and t11 is a negative sign, and terminates the sum accumulation. The sum is the magnitude of the flap after t11, which is 2 in this case. The flap from t10 to t11 was −2. The largest decreasing flap was from t5 to t6, while the largest increasing flap was from t6 to t8. The flap detector can start computing sums of each series of monotonic deltas from t3 to t13. The first series of monotonic deltas (i.e., increasing series of deltas) is from t3 to t5 in which the alarm level increases from 1 to 2 to 3. The next series of monotonic deltas is a single delta of −3 for the decrease in alarm level from 3 to 0. The alarm level deltas in the time window from t3 to t13 includes 7 monotonic series of deltas, which result in 7 flap magnitudes.

At operational stage C, the flap detector 103 filters alarm flaps. A flap magnitude threshold can be configured to filter out flaps considered to be insignificant by an administrator, for instance. Assuming an alarm flap magnitude threshold of 2, the flap detector 103 will disregard the flaps having a magnitude that does not exceed 2. Another threshold can be configured based on a number of significant flaps considered to be insignificant. An administrator may consider less than 2 flaps exceeding the flap magnitude threshold to be insignificant. The flap detector 103 counts the number of flap magnitudes that satisfy the flap magnitude threshold, and then determines whether that count satisfies a flap count threshold of 1. In this example, 2 of the computed flap magnitudes satisfy the flap magnitude threshold and this count exceeds the flap count threshold. Thus, the flap detector 103 determines that significant flapping has occurred in the time window from t3 to t13.

At operational stage D, the flap detector 103 generates a flapping alarm based on flap magnitudes. The flap detector 103 computes an average of the significant flap magnitudes and uses this value as the alarm level for the flapping alarm. In this example, the flap detector 130 determines the alarm level of 4 by computing an average of the significant flap magnitudes {3, 5} and then rounding the value, if needed, to conform to alarm levels used by the event management system. The average of the significant flap magnitudes is 4, which does not require any rounding to conform to the example alarm levels. The flap detector 103 can be programmed to determine the flapping alarm level with a variety of different techniques. The flap detector 103 could be programmed to always round up. The flap detector 103 could be programmed to use the largest flap magnitude or the last alarm level in a monotonic series instead of computing an average. The flap detector 103 can generate the flapping alarm with a value or flag that indicates the alarm is for detected flapping. The flap detector 103 can also generate the flapping alarm with additional information. Examples of the additional information include the delta array, flap magnitude array, time instants corresponding to flap magnitudes, etc.

In this example illustration, the flap detector 103 would have started generating flapping alarms when the example flap count threshold (1 flap) was exceeded at t8. The flap detector 103 or input parameters can be configured to avoid repeating flap alarms for a number of events and/or time period. For example, the flap detector 103 could be configured to discard or suppress a flapping alarm if 2 flapping alarms for a particular type of event (alarms) have been generated in the last 10 minutes. The flap detector 103 can be programmed to also augment a flapping alarm (e.g., increase a derived flapping alarm level) if n flapping alarms have been suppressed for the particular type of event.

Figure 2:
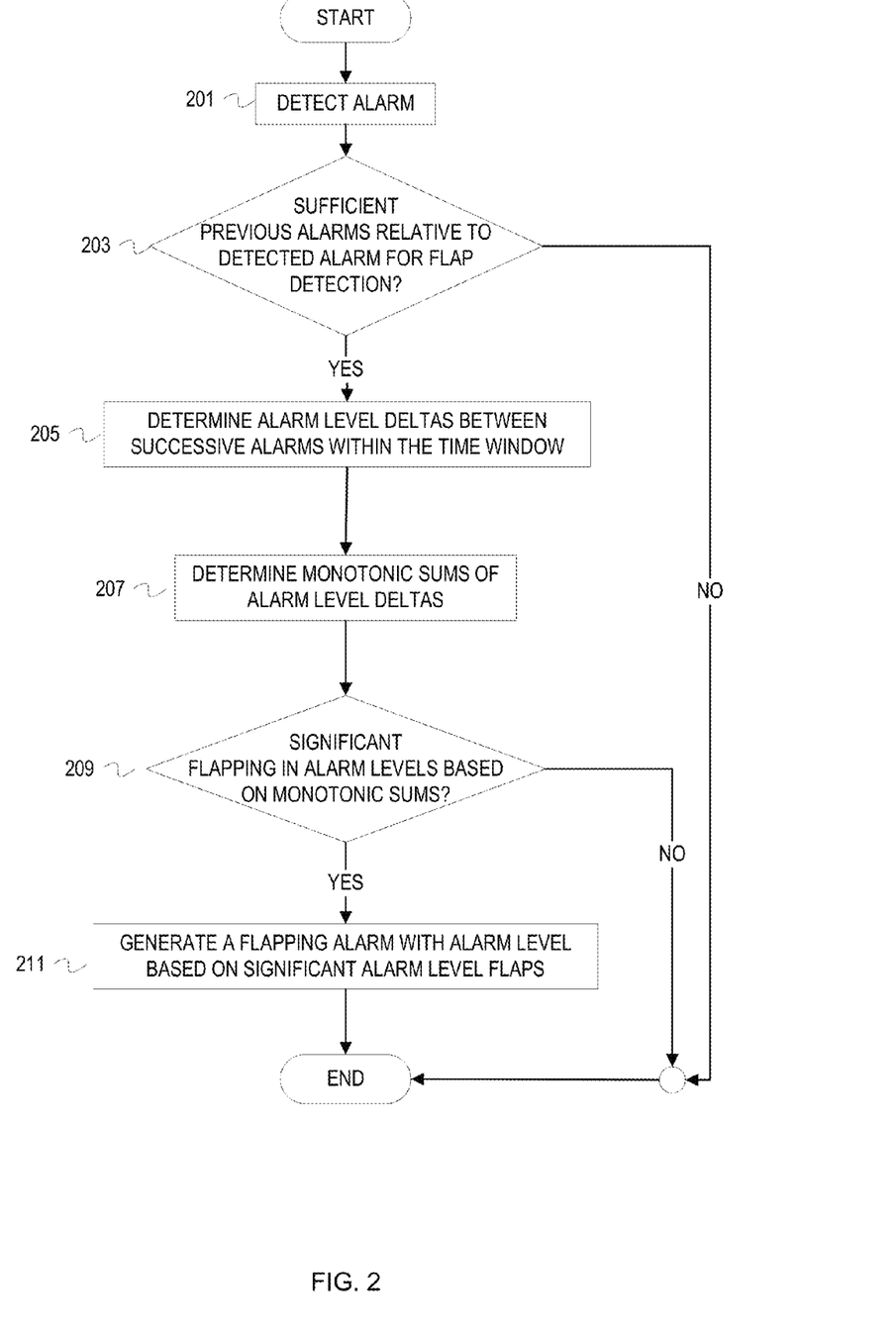
FIG. 2 depicts a flowchart of example operations for alarm flap detection.

FIG. 2 depicts a flowchart of example operations for alarm flap detection. FIG. 2 refers to a flap detector as performing the example operations for consistency with FIG. 1 and for simple naming. However, a program can be given a different name and perform these example operations or similar operations for magnitude-based alarm level flap detection.

A flap detector detects an alarm (201). The flap detector may receive alarms or notifications of alarms. The flap detector may monitor a location at which alarms are stored or subscribe to receiving alarms for a particular component or alarm type.

The flap detector determines whether there are sufficient previous alarms relative to the detected alarm for flap detection (203). Since flapping occurs over a number of alarms generated over time, the flap detector determines whether there are sufficient historical alarms within a relative time window to evaluate for flap detection. For instance, a sufficient threshold may be configured to be 3 previous alarms within a 24 hour window preceding the detected alarm. If there are sufficient historical alarms within the time window, then the flap detector determines alarm level deltas based on the detected alarm and historical alarms (205). If not, then the flap detector waits or terminates until a next alarm. The flap detector may enter a sleep state or wait until a next alarm is detected. In some cases, the flap detector may not be an ongoing process and may be invoked by another process when an alarm is detected.

The flap detector determines alarm level deltas between successive alarms within the time window (205). The flap detector computes a delta between the alarm level indicated in the detected alarm and an alarm level of a last detected alarm. The flap detector can then store this computed delta in a data structure of alarm level deltas (e.g., array, linked list, table, etc.) and read the historical alarm level deltas from the data structure. If previous deltas have not been computed because sufficient alarms had not yet been generated, then the flap detector can compute the deltas for the previous alarms that fall within the time window.

The flap detector determines sums of monotonic alarm level delta series ("monotonic sums") (207). The flap detector can begin at the beginning of the alarm level deltas at the beginning of the time window and traverse the alarm level deltas in temporal order. The flap detector accumulates a sum of deltas until it encounters a directional transition. At each directional transition, the flap detector begins to accumulate a new sum.

The flap detector determines whether any detected flapping in alarm levels is significant based on the monotonic sums (209). Since the monotonic sums are direction based, each monotonic sum corresponds to a flap. Due to the possibility of flaps that are not problematic, parameters can be set to filter out flaps. For example, an administrator may deem a flap magnitude less than an alarm level of 2 or in a bottom quartile of possible alarm levels as insignificant for detecting alarm flapping. In that case, the administrator can set a magnitude threshold accordingly. As previously mentioned, a count threshold can also be set to disregard a small number of flaps within a time window. If the flap detector determines that the flapping as represented by the monotonic sums does not satisfy conditions or exceed thresholds that define significance, then the flap detector terminates or waits until a next alarm. If there are no significant flaps, then the flap detector exits, sleeps, or returns to a calling process.

If the flap detector determines that the monotonic sums indicate significant flapping (209), then the flap detector generates a flapping alarm level based on the significant alarm level flaps (211). The flap detector determines the magnitudes of the monotonic sums (i.e., absolute values of the monotonic sums), and can compute an average of those magnitudes to derive a flapping alarm level. The particular technique for generating a value that represents an extent of alarm flapping can vary with the type of alarm and/or component corresponding to the alarm. For instance, generation of the flapping alarm level can be biased towards a higher alarm for components or systems that are more sensitive to flapping.

The above examples detect flapping in alarm levels. As previously mentioned, magnitude-based flap detection can also be used to detect flapping in resource consumption measurements and/or performance measurements of a system. Table 2 indicates example latency measurements in milliseconds (ms) and corresponding values computed for magnitude based flap detection for a time window of t2 to a1.

TABLE 2

| Latency Flap Detection Values | | | | | | | | | | |
|---|---|---|---|---|---|---|---|---|---|---|
| Time | t2 | t3 | t4 | t5 | t6 | t7 | t8 | t9 | t10 | t11 |
| Latency (ms) | 16 | 120 | 150 | 200 | 500 | 100 | 80 | 250 | 300 | 300 |
| Deltas | — | 104 | 30 | 50 | 300 | −400 | −20 | 170 | 50 | 0 |
| Flap Magnitudes | — | — | — | — | 484 | — | 420 | — | 220 | 0 |

For this example, a flap magnitude threshold has been configured to be 250 milliseconds. A flap detector would compute 3 flaps with magnitudes of 484 ms, 420 ms, and 220 ms. With the example flap magnitude threshold, the flap detector detects 2 significant latency flaps. Assuming that flap filtering does not employ a flap count threshold, the flap detector will generate a notification of the 2 significant flaps. The flap detector can generate a message with information about the 2 significant flaps. The flap detector could also generate a flap notification with a single representative value of the latency flapping. For example, the flap detector can compute an average of the significant flap magnitudes, which would be (484 ms+420 ms)/2=452 ms.

Figure 3:
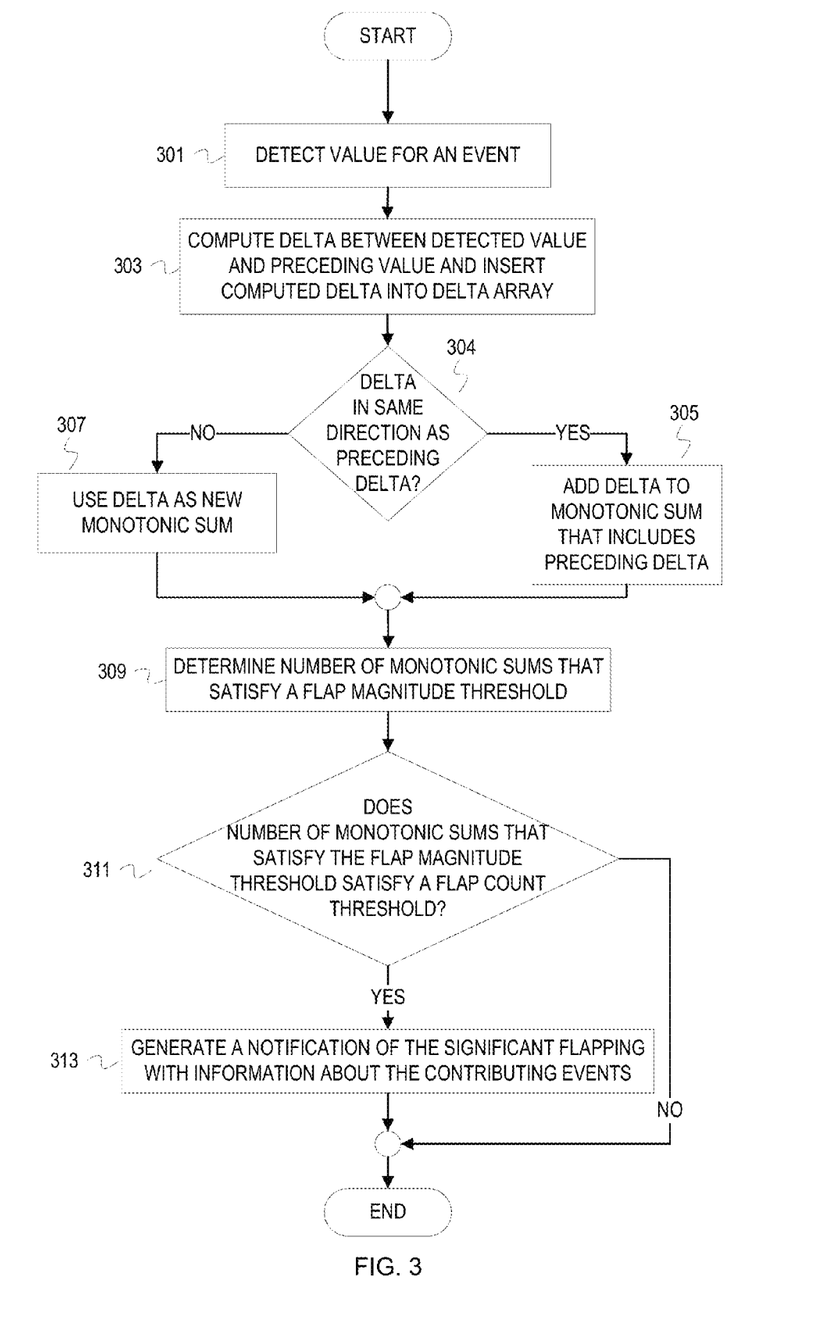
FIG. 3 depicts a flowchart of example operations for magnitude based flap detection for events.

FIG. 3 depicts a flowchart of example operations for magnitude-based flap detection for events. FIG. 3 refers more generally to events instead of alarm types of events as in FIG. 2. As with FIG. 2, FIG. 3 refers to a flap detector as performing the example operations. A flap detector can be instantiated for each type of event being monitored for flapping (e.g., a latency flap detector, an alarm flap detector, a system memory flap detector, etc.). A flap detector can be instantiated that processes different types of events. This more generalized flap detector can maintain data structures of deltas and flap magnitudes for each event type.

A flap detector detects a value for an event (301). Since an event can vary, notifications of events will use different metrics to indicate the event. For example, an event notification for resource consumption exceeding a threshold may indicate a value in terms of the amount of the resource consumed beyond the threshold at a time corresponding to the event or the amount of the resource consumed at the time of the event. As another example, an event notification may indicate a value in terms of a performance measurement at a time of an event (e.g., processor frequency at the time). The flap detector may receive an event notification with the value, may read the value from a preconfigured location, etc.

The flap detector computes a delta between the detected value and a preceding value and inserts the computed delta into a delta array (303). The flap detector may read the preceding value (e.g., a last detected value) from a time-ordered array of values. The flap detector can also insert the detected value into the time-ordered values array.

The flap detector determines whether the computed delta is in the same direction as the preceding delta (304). Since deltas have both magnitude and direction to indicate whether an attribute has been increasing or decreasing, the flap detector determines whether the computed delta has a same sign as the preceding delta in the delta array. A same direction indicates continuation of a monotonic series of deltas.

If the direction of the computed delta is the same as the previous delta (304), then the flap detector adds the computed delta to a monotonic sum that includes the previous delta (305). Since the monotonic series continues with the computed delta, then the computed delta can be added to the previously computed monotonic sum.

If the direction of the computed delta is not the same as the previous delta (304), then the flap detector uses the computed delta as a new monotonic sum (307). The flap detector could maintain a persistent data structure of monotonic sums and revise the sums that incorporate deltas at the beginning and the ending of a time window. The sums affected by the edges of the time window are revised to account for the deltas that fall outside of the time window and are newly introduced into the time window. The flap detector could, instead, compute the monotonic sums across the time window upon each flap detection trigger and maintain those for use for the particular trigger ("on-the-fly" monotonic sums).

After determination of a monotonic sum with the computed delta (307 or 305), the flap detector determines a number of monotonic sums that satisfy a flap magnitude threshold. As earlier mentioned, a threshold or condition can be set to filter out a flap with a magnitude that does not satisfy the threshold or the condition. The flap detector can traverse the determined monotonic sums and evaluate the magnitude of each monotonic sum against the condition or threshold. The flap counter can increment a counter for each magnitude that satisfies the magnitude threshold ("significant flap counter").

The flap detector determines whether the number of monotonic sums that satisfy the flap magnitude threshold satisfies a flap count threshold (311). If the significant flap counter satisfies the flap count threshold, then the flap detector generates a notification of the significant flapping (313). The flap detector can generate the notification with information about the contributing events. The contributing events are those events that correspond to the flaps with a magnitude that satisfied the magnitude threshold. The information may identify the events and/or the values of the events. If the flap count threshold was not satisfied (311), then the flap detector terminates/exits or waits until a next event.

The above examples presume that deltas are stored for later retrieval and use after initial computation. However, a flap detector can compute deltas on-the-fly. An event management system, or similar system, will likely maintain the values from events and/or the event notifications in a database, archive, or other type of persistent store. When triggered, the flap detector can retrieve the event values within a time window and compute the deltas across those event values.

The above example illustrations also presume that event notifications indicate a numerical value. In some cases, a notification may have a non-numeric value. As an example, an alarm levels may be "critical," "severe," "maintenance," and "normal." The flap detector can map these non-numeric alarm levels to numeric values. The flap detector can be configured with the mapping, can read data that informs the mapping, can be programmed with the mapping, etc. After mapping the non-numeric event values to numeric values, the flap detector can perform the flap detection.

The examples often refer to a "flap detector." The flap detector is a construct used to refer to implementation of functionality for the disclosed magnitude based flap detection. This construct is utilized since numerous implementations are possible. A flap detector may be a standalone program, plug-in, extension, component of an event management system, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, FIG. 2 delays computation of alarm level deltas until sufficient alarms have been generated within a time window. This delay is not necessary. The flap detector can compute deltas as alarm levels are detected. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a standalone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
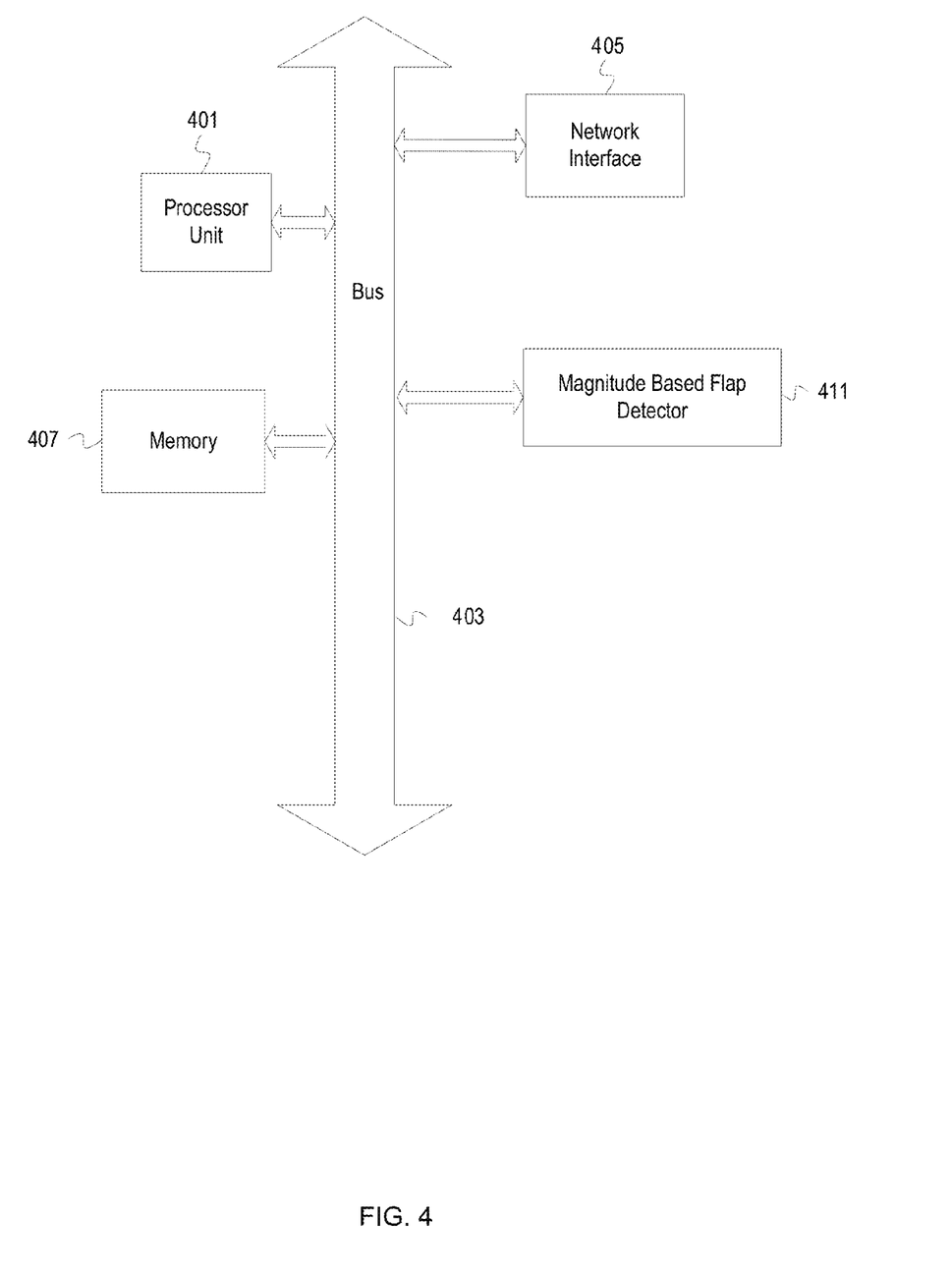
FIG. 4 depicts an example computer system with a magnitude based flap detector.

FIG. 4 depicts an example computer system with a magnitude-based flap detector. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes a magnitude based flap detector 411. The magnitude based flap detector 411 detects flapping based on magnitude of deltas between values representing successive events. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for magnitude based flap detection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   determining deltas between levels of successive alarms for a system within a time window;
   determining aggregates of monotonic series of the deltas;
   determining those of the aggregates of the monotonic series with a magnitude that satisfies a first threshold;
   determining that a second threshold is satisfied by a count of the aggregates that satisfy the first threshold; and
   in response to the determination that the second threshold is satisfied, generating an alarm that indicates flapping has been detected and that indicates a first alarm level based, at least in part, on the magnitudes of the aggregates that satisfy the first threshold.

2. The method of claim 1 further comprising:
   determining the first alarm level based, at least in part, on an average of the magnitudes of the aggregates that satisfy the first threshold.

3. The method of claim 1, wherein determining the aggregates of the monotonic series of the deltas comprises computing sums of the deltas in each monotonic series.

4. The method of claim 1, wherein the first threshold is an alarm level threshold.

5. The method of claim 1, wherein the second threshold is a count threshold.

6. The method of claim 1 further comprising detecting a second alarm level for a time instant t, wherein determining the deltas is in response to detecting the second alarm level.

7. The method of claim 6, wherein determining deltas comprises:
   determining, from a time ordered data structure of alarm level deltas, previously computed deltas between successive alarm levels at time instants which precede the time instant t in the time window;
   computing a most recent alarm level delta as a difference between the second alarm level and a third alarm level which corresponds to a time instant t−1; and storing the most recent delta in the time ordered data structure of alarm level deltas.

8. The method of claim 7, wherein determining the aggregates of the monotonic series of the deltas comprises:
traversing the time ordered data structure of alarm level deltas from oldest to newest and summing the deltas encountered while traversing until a change in direction of the deltas.

9. The method of claim 1 further comprising determining magnitudes of the aggregates of monotonic series of the deltas.

10. One or more machine readable storage media comprising program code for flap detection, the program code comprising instructions to:
determine deltas between levels of successive alarms for a system within a time window;
determine aggregates of monotonic series of the deltas;
determine those of the aggregates of the monotonic series with a magnitude that satisfies a first threshold;
determine that a second threshold is satisfied by a count of the aggregates that satisfy the first threshold; and
in response to the determination that the second threshold is satisfied, generate an alarm that indicates flapping has been detected and that indicates a first alarm level based, at least in part, on the magnitudes of the aggregates that satisfy the first threshold.

11. The machine-readable media of claim 10, wherein the instructions to generate the alarm that indicates the first alarm level comprise instructions to determine the first alarm level based, at least in part, on an average of the magnitudes of the aggregates that satisfy the first threshold.

12. An apparatus comprising:
a processor; and
a machine-readable medium having program code executable by the processor to cause the apparatus to,
determine deltas between levels of successive alarms for a system within a time window;
determine aggregates of monotonic series of the deltas;
determine whether any magnitudes of the aggregates of the monotonic series of the deltas satisfy a first threshold;
determine whether a second threshold is satisfied by a count of the aggregates that satisfy the first threshold; and
in response to a determination that the second threshold is satisfied, generate an alarm that indicates flapping has been detected in the time window and that indicates a first alarm level based, at least in part, on the magnitudes of the aggregates that satisfy the first threshold.

13. The apparatus of claim 12, wherein the machine-readable medium further has program code executable by the processor to cause the apparatus to:
determine the first alarm level based, at least in part, on an average of the magnitudes of the aggregates that satisfy the first threshold.

14. The apparatus of claim 12, wherein the program code to determine aggregates of monotonic series of the deltas comprises program code to compute sums of each monotonic series.

15. The apparatus of claim 12, wherein the first threshold is an alarm level threshold.

16. The apparatus of claim 12, wherein the second threshold is a count threshold.

17. The apparatus of claim 12, wherein the machine-readable medium further has program code executable by the processor to cause the apparatus to detect a second alarm level for a time instant t, wherein determination of the deltas is in response to detection of the second alarm level.

18. The apparatus of claim 17, wherein the program code to determine deltas comprises program code executable by the processor to cause the apparatus to:
determine, from a time ordered data structure of alarm level deltas, previously computed deltas between successive alarm levels at time instants which precede the time instant t in the time window;
compute a most recent delta of the deltas as a difference between the second alarm level and a third alarm level which corresponds to a time instant t−1; and
store the most recent delta into the time ordered data structure of alarm level deltas.

19. The apparatus of claim 18, wherein the program code to determine aggregates of monotonic series of the deltas comprises program code executable by the processor to cause the apparatus to:
traverse the time ordered data structure of alarm level deltas from oldest to newest and sum the deltas encountered while traversing until a change in direction of the deltas.

20. The apparatus of claim 12 wherein the machine-readable medium further has program code executable by the processor to cause the apparatus to determine magnitudes of the aggregates of monotonic series of the deltas.

* * * * *